United States Patent Office 3,452,122
Patented June 24, 1969

3,452,122
METHOD OF PRODUCING UNIFORM COLORED FOAMED MATERIALS
Alfred Stern, Newcastle-upon-Tyne, and Neville Maurice Sheldon, Whitley Bay, England, assignors to General Foam Products Limited, North Shields, England
No Drawing. Filed Jan. 19, 1966, Ser. No. 521,525
Claims priority, application Great Britain, Jan. 22, 1965, 2,991/65
Int. Cl. B29h 7/20; B29d 27/00
U.S. Cl. 264—46                              4 Claims

ABSTRACT OF THE DISCLOSURE

Uniformly coloured foam material can be produced from comminuted waste foam materials of diverse colours by bonding the particles of foam together by means of a foamable polyurethane binder including a pigment and a swelling agent having a swelling action on the waste foam. On curing the mixture, the swelling agent swells the foam particles and enables the pigment to penetrate substantially uniformly through them.

---

The present invention relates to the production of foamed materials, and more especially to the production of useful foam materials from waste foam material.

Processes have already been described by which foam materials can be produced by bonding together particles of previously formed foam materials, such as foam waste, and compositions which form foamed polyurethane resins have been found to be especially useful as bonding agents.

The present invention provides a process by which finely divided pulverulent materials can be dispersed throughout the mass of a foam material produced from particles of previously formed foam, and desirable new properties conferred on the product.

In the process according to the invention comminuted previously formed foam material is impregnated with a composition for forming a foamed polyurethane resin, the composition also including a finely divided pulverulent material and a liquid having a swelling or otherwise highly penetrating action on the comminuted material, and introduced into a mould and the resin-forming composition is cured under pressure.

The presence of the finely divided material can affect both the apperance and the physical properties of the product.

For example, where waste foam from a variety of sources is employed as the raw material, the product of the already described process has generally had a multi-coloured or mottled appearance arising from the different colours of different particles in the raw material. It has now surprisingly been found that if a finely ground pigment is employed in accordance with the present invention, a substantially uniformly coloured product can be obtained from a mixture of previously formed foam materials of different colours.

The product not only has a substantially uniform colour but also has a fine surface texture. The cavities surrounding the particles or comminuted foam are filled with new foam and the new foam penetrates the particles sufficiently to achieve substantially uniform coloration. Owing to the difference in surface tension effects between the cavities and the particles of communited foam, and the shrinkage of the new foam on curing and evaporation of the swelling or penetrant liquid, high internal stresses are set up which confer on the product unusual cushioning properties.

Apart from pigments, other finely divided pulverulent solids can be similarly dispersed, either alone or in combination with pigments. The addition of such other finely divided solids can be employed to modify the effective cell size of the resulting foam, owing to their shape and absorbent properties and such modified materials can be of value as filtration media. Of particular interest in this respect are micronised carbon and micro-talc.

Where such further additives are themselves coloured, there will be a tendency for the product to assume a uniform coloration, but the result will not be as complete as when a pigment of high covering power is employed.

The preferred previously formed foam material is polyurethane, and more especially polyether foam, for example polyether waste, and in this case the preferred swelling or penetrating liquids are halogenated hydrocarbons, for example methylene chloride.

The previously formed foam may be finely ground or chipped, generally to a particle size of less than 12 mm. The preferred particle size is of the order of 3–4 mm., penetration of the colour becoming progressively more difficult as the particle size increases. The pigment is preferably pre-ground to a particle size of a few microns and can be added to the polyurethane resin-forming composition as a slurry.

The curing of the resin-forming composition is preferably carried out between heated platens, for example at approximately 60° C., the time of dwell depending on the size of block, its density, and other parameters. It is also possible to flash cure between platens and then oven cure or, depending on the type of polyurethane resin and on the catalyst employed, a cold cure may be used, especially for polyester types, which react more readily in the cold.

The following is an example of how the invention can be put into practice, all quantities being expressed in parts by weight.

225 parts by weight of 3 mm. polyether flake are treated with 13.3 parts of urethane foam resin, 14.35 parts of toluene diisocyanate, and 24.2 parts of a colour concentrate which consists of pigment and urethane resin in the proportions of three parts of pigment to two of resin. The mixture is diluted with 69.25 parts of methylene chloride.

After the flake has been compounded with the pigmented foam resin composition for a few minutes, the mixture is filled into a mould, compressed to a density of 14 lbs./cu. ft., and cured between platens heated to a temperature of 60° C.

If a flame retardant material is required, tris (2,3-dichloropropyl) phosphate or tris (2,3-dibromopropyl) phosphate can be included, for example to the extent of 8% by weight based on the weight of polyurethane flake. These flame-proofing materials can simply be added to the polyurethane resin mix in concentrations of, for example, 7–12%.

We claim:
1. In the production of foam material by bonding together particles of comminuted previously formed foam material with a foamable polyurethane resin composition, the method of producing a material having a substantially uniform colour throughout which comprises the steps of:
    (a) incorporating with said foamable polyurethane composition a finely divided pigment and a swelling agent having a swelling action on said previously formed foam material;
    (b) impregnating said comminuted material with said composition;
    (c) enclosing said impregnated comminuted material in a mold; and
    (d) subjecting said enclosed material to conditions effective to cause said swelling agent to swell said particles, thereby enabling said pigment to penetrate said particles, and to cause said foamable composition to foam and cure and bond said particles together.

2. A method according to claim 1 wherein said swelling agent is evaporated from the cured, bonded foam material.

3. A process according to claim 1 in which the previously formed foam material is a polyurethane, and the swelling agent is a halogenated hydrocarbon.

4. A process according to claim 1 in which the previously formed foam material has an average particle size of less than 12 mm.

References Cited

UNITED STATES PATENTS 2,892,216   6/1959   Steel _____ 264—46

JULIUS FROME, *Primary Examiner.*

L. GARRETT, *Assistant Examiner.*

U.S. Cl. X.R.

264—51, 53